Patented Oct. 26, 1954

2,692,896

UNITED STATES PATENT OFFICE 2,692,896

PROCESS FOR THE PRODUCTION OF N-ACYLAMIDO DIOLS

Harry M. Crooks, Jr., Detroit, Mich., assignor to Parke, Davis & Company, Detroit, Mich., a corporation of Michigan No Drawing. Application August 22, 1951, Serial No. 243,167

9 Claims. (Cl. 260—562)

This invention relates to a process for the production of N-acylamido diols. More particularly, the invention relates to a process for the production of 1 - p - nitrophenyl - 2 - dichloro - acetamido-1,3-propanediols having the formula,

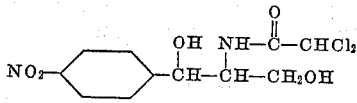

Both the starting materials and products of the process exist in structural as well as optical isomeric forms. The term "structural" refers to the spatial relationship of the polar groups attached to the two asymmetric carbon atoms. In order to differentiate between these structural or diastereoisomeric forms they will subsequently be referred to as the "threo" and "erythro" forms in accordance with the accepted nomenclature for this type of product.

Both the threo and erythro forms exist in optically racemic as well as optically active forms. Because of the difficulty of graphically representing the different structural and optical forms the customary graphic formulas will be used and a designation placed below or to the side of the formula to designate the particular structural and optical configuration of the compound. It should be expressly understood that where no notation appears with a structural formula the formula is to be interpreted in its generic sense, that is, as representing the D-threo, L-threo, D-erythro and L-erythro in separated form as well as the DL-threo and DL-erythro optical racemates and the total unresolved mixture of structural and optical isomers. Such a formula does not merely represent the unresolved mixture of isomers.

In accordance with the invention, 1-p-nitrophenyl - 2 - dichloroacetamido - 1,3 - propanediols having the above formula are produced by reacting a 1-p-nitrophenyl-2-amino-1,3-propanediol of formula,

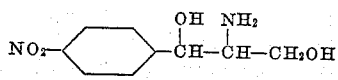

with dichloroacetamide or an N-acyl derivative thereof. Among the N-acylated dichloroacetamides which have produced satisfactory results in the process of the invention are those wherein the N-acyl substituent is derived from a lower aliphatic carboxylic acid, a halogen substituted lower aliphatic carboxylic acid, an alkoxy substituted lower aliphatic acid, benzoic acid, a benzoic acid containing one or more ring substituents such as alkyl, alkoxy, halogen and nitro groups and the like. Some specific examples of such N-acylated dichloroacetamides are N-acetyl dichloroacetamide, N - dichloroacetyl dichloroacetamide, N-benzoyl dichloroacetamide, N-propionyl dichloroacetamide, N-methoxyacetyl dichloroacetamide, N - p - methylbenzoyl dichloroacetamide, N-p-nitrobenzoyl dichloroacetamide, N - p - methoxybenzoyl dichloroacetamide, N-o-bromobenzoyl dichloroacetamide and the like.

In carrying out the process alcoholic, aqueous or aqueous alcoholic solvents may be used. For example, water, aqueous methanol, aqueous ethanol, aqueous isopropanol, methanol, ethanol, isopropanol, n-propanol, butanol and the like can be employed.

The relative quantities of the reactants is not particularly critical but for economic reasons it is customary to employ either approximately equimolar amounts of the two reactants or a slight excess of the dichloroacetamide or N-acylated dichloroacetamide. When using an N-acylated dichloroacetamide as the acylating agent the reaction proceeds so rapidly that the reaction mixture does not need to be heated. However, when dichloroacetamide is used as the acylating agent, the reaction mixture should be heated to bring about the reaction within a reasonable time. In general, the reaction mixture should not be heated above about 100° C. because higher temperatures bring about considerable decomposition of the amino diol starting material. Best results are obtained using a temperature in the neighborhood of 50 to 80° C. In the case of dichloroacetamide the use of a basic catalyst such as an alkali metal alkoxide or an alkali metal carbonate also increases the yield and reduces the reaction time. The temperature is not critical when using the N-acylated dichloroacetamides because the reaction proceeds so rapidly that in most cases the amino diol starting material is completely converted into the heat-stable acylamido diol before the reaction mixture can be even heated to 100° C. This being the case, there is no necessity for employing temperatures in excess of 100° C. in conjunction with the N-acylated dichloroacetamides.

The products produced by the process of the invention find use as antibiotics or as chemical intermediates for the production of other organic compounds possessing antibiotic activity. For example, the product of Example 1, D-(—)-threo-1 - p - nitrophenyl - 2 - dichloroacetamido - 1,3-diol, which is commonly known as chloramphenicol is of particular value in the treatment of typhoid fever, typhus, urinary tract infections, gonorrhea and many other diseases and conditions.

The invention is illustrated by the following examples:

Example 1

A solution consisting of 2.5 g. of N-dichloroacetyl dichloroacetamide and 2.1 g. of D-(—)-threo - 1 - p - nitrophenyl - 2 - amino - 1,3 - propanediol in 20 cc. of methanol is heated for five minutes at 65° C. The reaction mixture is concentrated to a volume of about 10 cc. in a stream of air and then diluted to a volume of 40 cc. with warm water. The solution is cooled and the crystalline D-(—)-threo-1-p-nitrophenyl-2 - dichloroacetamido - 1,3 - propanediol (chloramphenicol) collected; M. P. 150–1° C.

Example 2

A solution consisting of 0.9 g. of N-acetyl dichloroacetamide and 1.0 g. of DL-threo-1-p-nitrophenyl-2-amino-1,3-propanediol in 10 cc. of methanol is heated for five minutes under reflux (temperature about 65–68° C.) and then concentrated to a volume of about 5 cc. by blowing a stream of air over the surface of the reaction mixture. The residue is diluted with 20 cc. of warm water, the solution cooled and the crystalline DL-threo-1-p-nitrophenyl-2-dichloroacetamido - 1,3 - propanediol (optically racemic chloramphenicol). After recrystallization from ethyl acetate-petroleum ether mixture the product melts at 150° C.

Example 3

A solution consisting of 2.6 g. of dichloroacetamide and 3 g. of D-(—)-threo-1-p-nitrophenyl-2-dichloroacetamido-1,3-propanediol in 10 cc. of methanol is heated under reflux (temperature about 65–68° C.) for one hour. During the heating period ammonia is evolved and the reaction mixture becomes dark. The reaction mixture is diluted with water and the solution neutralized with acetic acid. The crystalline D-(—)-threo-1 - p - nitrophenyl - 2 - dichloroacetamido - 1,3-propanediol is collected and purified by recrystallization from hot water with charcoaling; M. P. 150–1° C.

Example 4

2 cc. of a 1 N solution of sodium methylate in anhydrous methanol is added to a solution consisting of 1 g. of DL-threo-1-p-nitrophenyl-2-amino-1,3-propanediol and 0.82 g. of dichloroacetamide in 25 cc. of anhydrous methanol and the solution heated under reflux for one hour. The reaction mixture is evaporated to a volume of 10 cc. in a stream of air, diluted with 40 cc. of water and extracted with ethyl acetate. The ethyl acetate extract is washed with dilute hydrochloric acid, sodium bicarbonate solution and then with water. The ethyl acetate solution is dried over magnesium sulfate and the ethyl acetate distilled to obtain the desired DL-threo-1 - p - nitrophenyl - 2 - dichloroacetamido - 1,3-propanediol; M. P. 150° C.

Example 5

A solution consisting of 2.3 g. of N-benzoyl dichloroacetamide and 2.1 g. of D-(—)-threo-1 - p - nitrophenyl - 2 - amino - 1,3 - propanediol in 30 cc. of methanol is heated at 40° C. for one-half hour. The reaction mixture is concentrated to a volume of about 10 cc. in a stream of air and diluted to a volume of 40 cc. with warm water. The solution is allowed to cool and the crystalline D - (—)-threo - 1 - p - nitrophenyl-2 - dichloroacetamido - 1,3 - propanediol collected and purified by recrystallization from water; M. P. 151° C.

Example 6

A solution consisting of 1.9 g. of N-butyryl dichloroacetamide and 2.1 g. of L-(+)-threo-1 - p - nitrophenyl - 2 - amino - 1,3 - propanediol in 20 cc. of ethanol is allowed to stand at room temperature for about one and one-half hours. The reaction mixture is concentrated to dryness in a stream of air and the residue taken up in 45 cc. of hot water. The aqueous solution is cooled and the crystalline L-(+)-threo-1-p - nitrophenyl-2-dichloroacetamido-1,3-propane collected; M. P. 150–1° C.

Example 7

A mixture consisting of 2.5 g. of N-dichloroacetyl dichloroacetamide and 2.1 g. of DL-threo-1-p-nitrophenyl-2-amino-1,3-propanediol in 50 cc. of water is heated to boiling and the resulting solution allowed to cool. (During the heating period solution of the reactants becomes complete at about 65° C.) The crystalline DL-threo - 1 - p-nitrophenyl - 2 - dichloroacetamido-1,3-propanediol is collected and dried; M. P. 150° C.

Example 8

A mixture consisting of 2.5 g. of N-dichloroacetyl dichloroacetamide and 2.1 g. of D-(—)-threo - 1- p - nitrophenyl - 2 - amino - 1,3 - propanediol and 75 cc. of 50% aqueous methanol is stirred at room temperature for one hour. Most of the methanol is removed from the reaction mixture by distillation in vacuo and the aqueous residue heated until the solids dissolve. The D - (—) - threo - 1 - p - nitrophenyl - 2-dichloroacetamido-1,3-propanediol which separates on cooling is collected and dried; M. P. 150–1° C.

Example 9

A solution consisting of 2.5 g. of N-dichloroacetyl dichloroacetamide and 2.1 g. of DL-erythro - 1 - p - nitrophenyl - 2 - amino - 1,3-propanediol in 20 cc. of methanol is warmed at 50° C. for ten minutes. The reaction mixture is concentrated to a volume of 10 cc. in a stream of air and diluted to a volume of 40 cc. with warm water. The solution is cooled and the crystalline DL - erythro - 1 - p - nitrophenyl-2 - dichloroacetamido - 1,3 - propanediol collected and dried; M. P. 169–70° C.

Example 10

A solution consisting of 2.0 g. of N-acetyl dichloroacetamide and 2.1 g. of D-(—)-threo-1-p-nitrophenyl-2-amino-1,3-propanediol in 20 cc. of methanol is heated at 50° C. for ten minutes. The reaction mixture is concentrated to a volume of 10 cc. in a stream of air and then diluted to a volume of 40 cc. with hot water. The solution is cooled and the crystalline D-(—)-threo-1 - p - nitrophenyl - 2 - dichloroacetamido - 1,3-propanediol collected and dried; M. P. 150–1° C.

What I claim is:

1. Process for the production of a 1-p-nitrophenyl - 2 - dichloroacetamido - 1,3 - propanediol of formula,

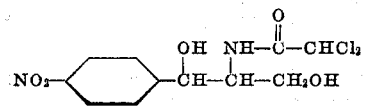

which comprises reacting at a temperature below 100° C. a 1-p-nitrophenyl-2-amino-1,3-propanediol of formula,

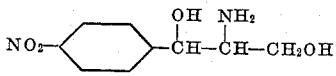

with an acylating agent having the formula R—NHCOCHCl₂ where R is a member of the class consisting of hydrogen and carboxylic acid acyl.

2. Process for the production of a 1-p-nitrophenyl - 2 - dichloroacetamido - 1,3 - propanediol of formula,

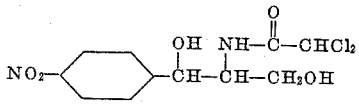

which comprises reacting at a temperature below 100° C. a 1 - p - nitrophenyl - 2 - amino - 1,3-propanediol with an acylating agent having the formula acyl-NHCOCHCl₂ where acyl is lower fatty acid acyl.

3. Process for the production of chloramphenicol which comprises reacting at a temperature below 100° C. D-(—)-threo-1-p-nitrophenyl-2-amino-1,3-propanediol with N-dichloroacetyl dichloroacetamide.

4. Process for the production of chloramphenicol which comprises reacting at a temperature below 100° C. D-(—)-threo-1-p-nitrophenyl-2-amino-1,3-propanediol with N-acetyl dichloroacetamide.

5. Process for the production of optically racemic chloramphenicol which comprises reacting at a temperature below 100° C. DL-threo-1 - p - nitrophenyl - 2 - amino - 1,3 - propanediol with N-dichloroacetyl dichloroacetamide.

6. Process for the production of optically racemic chloramphenicol which comprises reacting at a temperature below 100° C. DL-threo-1-p-nitrophenyl-2-amino-1,3-propanediol with N-acetyl dichloroacetamide.

7. Process for the production of chloramphenicol which comprises heating D-(—)-threo-1-p-nitrophenyl-2-amino-1,3-propanediol with dichloroacetamide at a temperature of 50° to 80° C.

8. Process for the production of a 1-p-nitrophenyl - 2 - dichloroacetamido - 1,3-propanediol of formula,

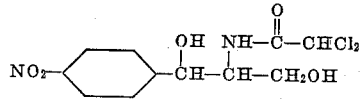

which comprises reacting at a temperature below 100° C. a 1-p-nitrophenyl-2-amino-1,3-propanediol of formula,

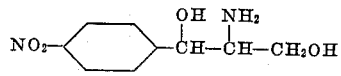

with an acylating agent having the formula acyl-NHCOCHCl₂ where acyl is halogen substituted lower fatty acid acyl.

9. Process for the production of chloramphenicol which comprises heating to a temperature about 65° C. a methanol solution containing N-dichloroacetyl dichloroacetamide and D-(—)-threo - 1 - p - nitrophenyl - 2 - amino - 1,3 - propanediol, concentrating the methanol solution, diluting with water, cooling and collecting from the aqueous methanol solution crystallized chloramphenicol.

References Cited in the file of this patent

UNITED STATES PATENTS

| Number | Name | Date |
|---|---|---|
| 2,483,884 | Crooks et al. | Oct. 4, 1949 |
| 2,538,764 | Crooks et al. | Jan. 23, 1951 |

OTHER REFERENCES

Degering: "An Outline of Organic Nitrogen Compounds" (1945), p. 409.

Galat et al.: "J. Am. Chem. Soc.," vol. 65 (1943), pp. 1566–67.